United States Patent [19]
Ohno

[11] Patent Number: 5,568,079
[45] Date of Patent: Oct. 22, 1996

[54] STEP-UP METHOD AND STEP-UP CIRCUIT

[75] Inventor: Kenzo Ohno, Kanagawa-ken, Japan

[73] Assignee: Kabushiki Kaisha Toshiba, Kawasaki, Japan

[21] Appl. No.: 525,012

[22] Filed: Sep. 8, 1995

[30] Foreign Application Priority Data

Sep. 9, 1994 [JP] Japan .................................. 6-215837

[51] Int. Cl.⁶ .................................................. G06F 7/556
[52] U.S. Cl. ......................................... 327/349; 327/356
[58] Field of Search ...................................... 327/356, 349

[56] References Cited

U.S. PATENT DOCUMENTS 5,457,417  10/1995  Shou et al. ............................ 327/356

*Primary Examiner*—Margaret Rose Wambach
*Attorney, Agent, or Firm*—Oblon, Spivak, McClelland, Maier & Neustadt, P.C.

[57] ABSTRACT

A step-up circuit involves a short step-up time and improved step-up efficiency. The step-up circuit has capacitors. First and second power source voltages are applied to the first and second electrodes of each capacitor, respectively. Thereafter, the capacitors are connected in series so that the second electrode of the first capacitor is connected to the first electrode of the second capacitor. At this time, the second power source voltage is applied to the first electrode of the first capacitor, and the potential of the second electrode of each capacitor is provided as an output voltage.

5 Claims, 7 Drawing Sheets

5,568,079

STEP-UP METHOD AND STEP-UP CIRCUIT

BACKGROUND OF THE INVENTION

1. Field of the Invention

The present invention relates to a step-up method and a semiconductor integrated step-up circuit.

2. Description of the Prior Art

FIG. 1 shows a triple step-up circuit according to a prior art.

The circuit has an n-channel MOS (NMOS) transistor 101, p-channel MOS (PMOS) transistors 102 to 106, and capacitors 107 to 109. The NMOS transistor 101 is controlled by a signal A2, and the PMOS transistor 102 is controlled by a signal /A2, i.e., an inversion of the signal A2. The PMOS transistors 103 and 104 are controlled by a signal /B2, and the PMOS transistors 105 and 106 are controlled by a signal /C2.

FIG. 2 is a timing chart showing the operation of the triple step-up circuit of FIG. 1.

In a period T1, the signal A2 is HIGH and the signal /A2 is LOW, to turn ON the NMOS transistor 101 and PMOS transistor 102. At this time, the signals /B2 and /C2 are each HIGH to turn OFF the PMOS transistors 103 to 106. As a result, a ground voltage GND is applied to a terminal "a" of the capacitor 107 through the NMOS transistor 101, and an input voltage V2in is applied to the other terminal "b" thereof through the PMOS transistor 102.

When the signal A2 changes to LOW and the signal /A2 to HIGH to turn OFF the NMOS transistor 101 and PMOS transistor 102, the capacitor 107 holds a potential difference corresponding to the input voltage V2in.

In a period T2, the signal /B2 changes to LOW to turn ON the PMOS transistors 103 and 104. At this time, the signal /C2 is still HIGH to turn OFF the PMOS transistors 105 and 106. As a result, the input voltage V2in is applied to the terminal a of the capacitor 107 through the PMOS transistor 108. Then, the capacitor 107 causes coupling, to increase the voltage of the terminal b thereof twice as large as the input voltage V2in, and the capacitor 108 is charged through the PMOS transistor 104.

When the signal /B2 changes to HIGH to turn OFF the PMOS transistors 103 and 104, the voltage of a terminal "c" of the capacitor 108 becomes twice as large as the input voltage V2in.

In period T3, the signal A2 changes to HIGH to turn ON the NMOS transistor 101 and PMOS transistor 102. Thereafter, the signal A2 changes to LOW to turn OFF the NMOS transistor 101 and PMOS transistor 102, and the capacitor 107 holds a potential difference corresponding to the voltage V2in.

In period T4, the signal /C2 changes to LOW to turn ON the PMOS transistors 105 and 106. Then, the voltage of the terminal c of the capacitor 108, which is twice as large as the voltage V2in, is applied to the terminal a of the capacitor 107 through the PMOS transistor 105. As a result, the capacitor 107 causes coupling to make the voltage of the terminal b of the capacitor 107 three times as large as the voltage V2in, and the capacitor 109 is charged through the PMOS transistor 106.

When the signal /C2 changes to HIGH to turn OFF the PMOS transistors 105 and 106, the voltage of a terminal "d" of the capacitor 109 will be three times as large as the voltage V2in. Namely, an output voltage V2out is three times as large as the input voltage V2in.

The problems of this step-up circuit will be explained.

The output voltage V2out becomes three times as large as the input voltage V2in through the operations of (1) charging the capacitor 107, (2) doubling the input voltage V2in by coupling, (3) charging the capacitor 107, and (4) multiplying the input voltage V2in by three by coupling. Each step-up cycle must involve these four operations corresponding to the periods T1 to T4 of FIG. 2.

To provide an output voltage that is "m" times larger than an input voltage (m being an integer equal to or larger than two), the prior art needs "2×(m−1)" operations. Namely, the prior art takes a long time to provide a stepped-up voltage. When supplying the output voltage V2out to the next circuit, such a long step-up time causes a large drop in the output voltage with respect to a load current.

The step-up efficiency of the capacitors 107 to 109 of the prior art during an initial stage will be explained. It is supposed that the MOS transistors have no ON-resistance and the capacitors have an identical capacitance value.

Each of the capacitors is discharged in the initial stage, to have no potential difference between the opposite electrodes thereof. In the period T1, the terminal b of the capacitor 107 holds the input voltage V2in. In the period T2, the capacitors 107 and 108 share charges. Namely, the terminal c of the capacitor 108 holds a voltage of V2in=(2×V2in [the voltage of the terminal b of the capacitor 107]+0 [the voltage of the terminal c of the capacitor 108 before sharing charges])/2 [the number of capacitors]. This voltage V2in provided by the capacitor 108 in the initial stage is 50% of the voltage "2×V2in" provided by the same under a steady state.

In the period T3, the terminal b of the capacitor 107 holds the voltage V2in. In the period T4, the capacitors 107 and 109 share charges. Accordingly, the output voltage V2out will be V2in=(2×V2in [the voltage of the terminal b of the capacitor 107]+0 [the voltage of the terminal d of the capacitor 109 before sharing charges])/2 [the number of capacitors]. This output voltage V2out in the initial stage is 33% of the output voltage "3×V2in" expected under a steady state.

Namely, when providing an output voltage n times larger than an input voltage, the prior art provides only "1/n×100" percents of the expected output voltage during an initial stage.

SUMMARY OF THE INVENTION

An object of the present invention is to provide a step-up method and a step-up circuit that efficiently carry out step-up operations.

Another object of the present invention is to provide a step-up method and a step-up circuit that quickly provide an expected output voltage.

Still another object of the present invention is to provide a step-up method and a step-up circuit that efficiently provide a stable output voltage.

Still another object of the present invention is to provide a step-up method and a step-up circuit that are fast with two step-up operations in each cycle.

Still another object of the present invention is to provide a step-up method and a step-up circuit that are efficient with small capacitors.

Still another object of the present invention is to provide a step-up method and a step-up circuit that employ a small number of control signals and a simple timing circuit.

In order to accomplish the objects, the present invention provides a step-up circuit having a first switching element, a first capacitor, and a second switching element connected in series between a low-voltage power source and a high-voltage power source in this order; a third switching element for selectively connecting a node between the first switching element and the first capacitor to the high-voltage power source; a fourth switching element, a second capacitor, and a fifth switching element connected in series between the low-voltage power source and the high-voltage power source in this order; a sixth switching element for selectively connecting a node between the second switching element and the first capacitor to a node between the second capacitor and the fourth switching element; and a timing signal generator for supplying control signals to the first to sixth switching elements.

A seventh switching element and a third capacitor may be connected in series between a node between the fifth switching element and the second capacitor and the low-voltage power source.

Alternatively, the seventh switching element, the third capacitor, and an eighth switching element are connected in series between the low-voltage power source and the high-voltage power source. A ninth switching element selectively connects a node between the fifth switching element and the second capacitor to a node between the third capacitor and the seventh switching element.

The present invention also provides a step-up method including the steps of connecting capacitors in parallel between a low-voltage power source and a high-voltage power source and charging the capacitors; connecting the capacitors in series between the high-voltage power source and an output terminal, to multiply a voltage between the low- and high-voltage power sources by a constant; and repeating these two steps.

In this way, the present invention connects the capacitors each holding an input voltage in series and provides an output voltage. Each step-up cycle according to the present invention involves two operations, i.e., (1) charging each capacitor and (2) multiplying an input voltage by "m" by coupling. This results in shortening a step-up time and improving step-up efficiency.

DETAILED DESCRIPTION OF THE EMBODIMENTS

Figure 1:
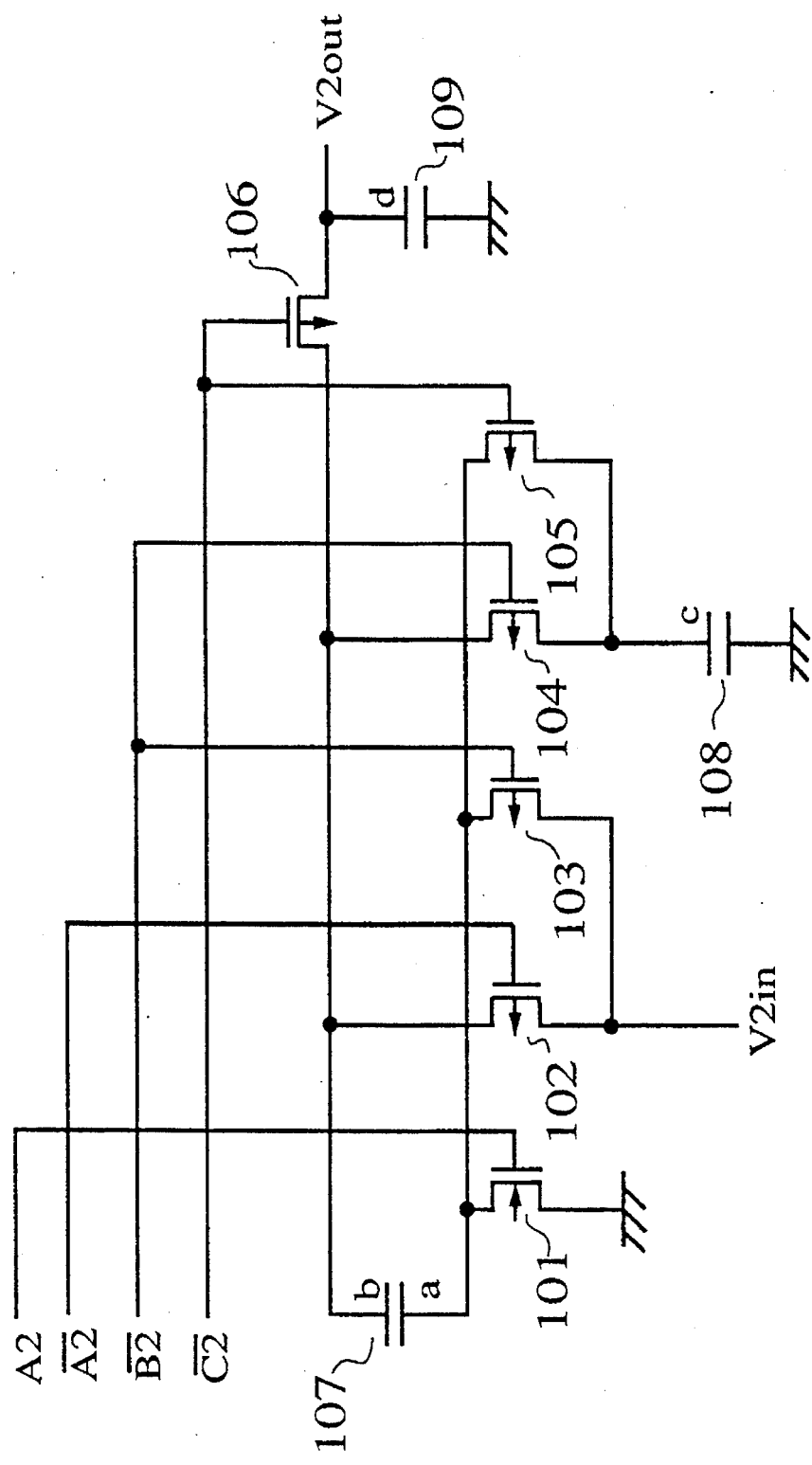
FIG. 1 is a circuit diagram showing a triple step-up circuit according to a prior art.
Figure 2:
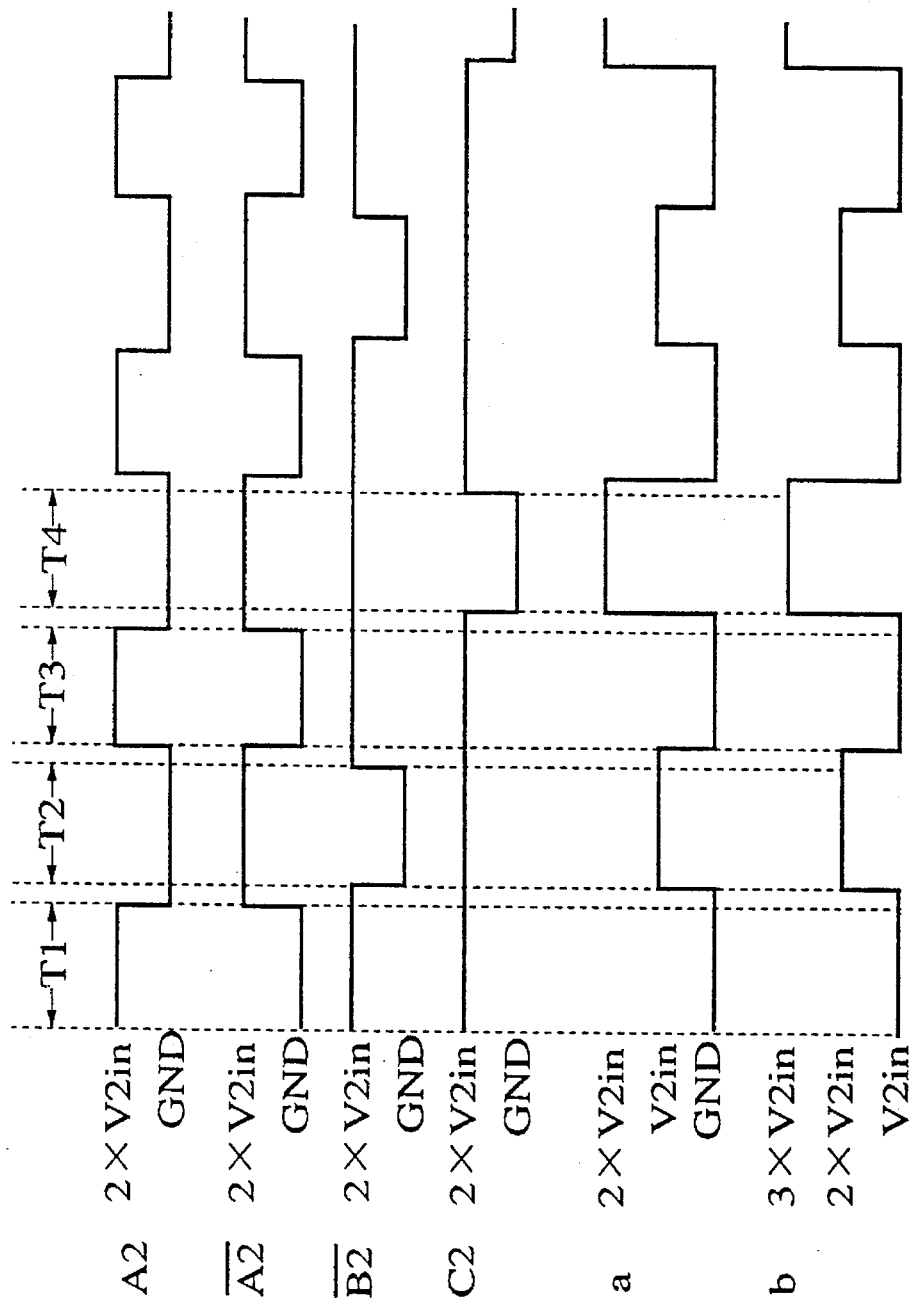
FIG. 2 is a timing chart showing the operation of the step-up circuit of FIG. 1.
Figure 3:
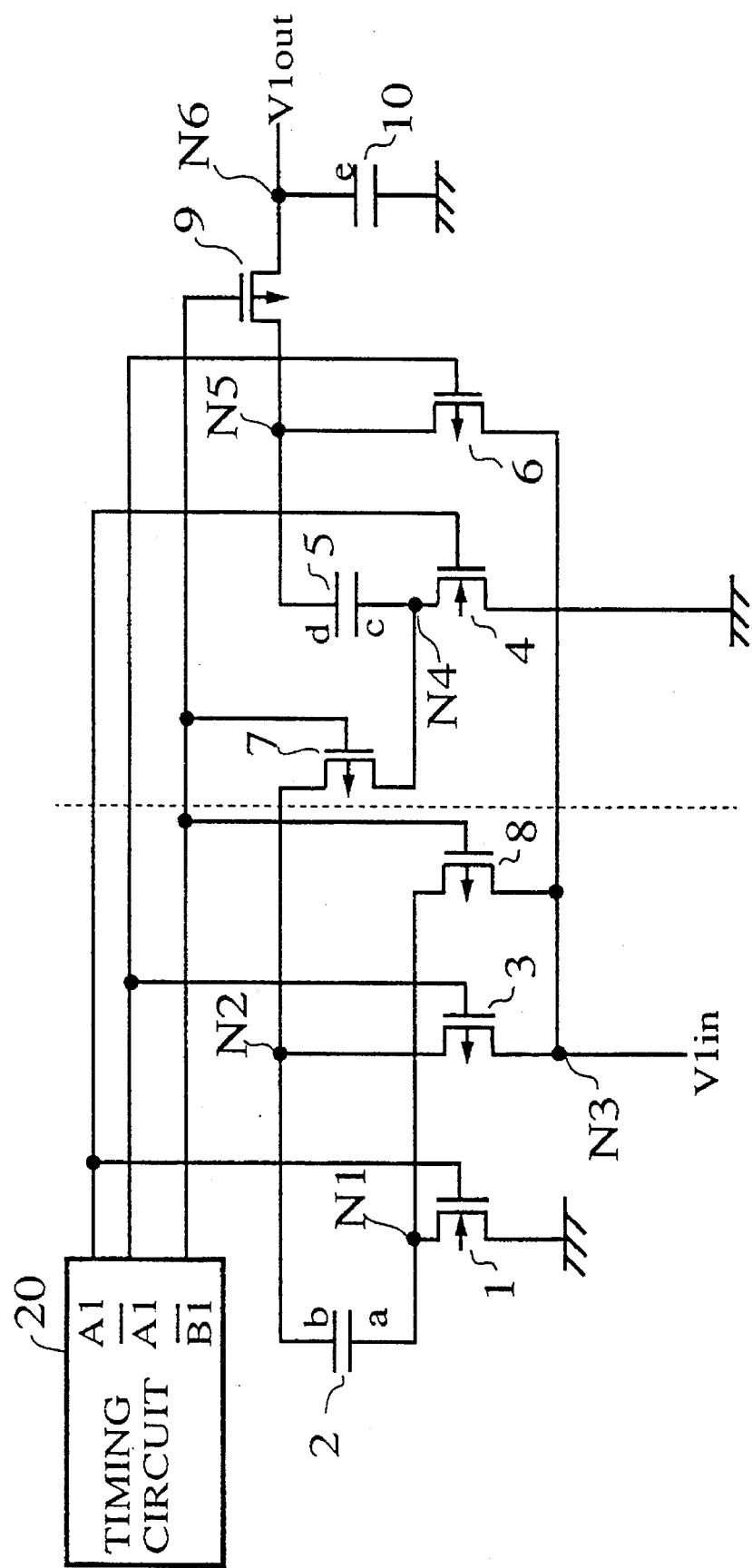
FIG. 3 is a circuit diagram showing a step-up circuit according to an embodiment of the present invention.

FIG. 3 is a circuit diagram showing a step-up circuit according to an embodiment of the present invention.

An NMOS transistor 1, a capacitor 2, and a PMOS transistor 3 are connected in series between a ground voltage GND and an input voltage V1in (for example, 1.5 V), to form a first element group. An NMOS transistor 4, a capacitor 5, and a PMOS transistor 6 are connected in series between the ground voltage GND and the input voltage V1in, to form a second element group. The first and second element groups are arranged in parallel with each other between the ground voltage GND and the input voltage V1in. The NMOS transistors 1 and 4 and the PMOS transistors 3 and 6 are switching elements.

In the first element group, the NMOS transistor 1 is between a node N1 and the ground voltage GND. The node N1 is connected to a terminal "a" (first electrode) of the capacitor 2. Another terminal "b" (second electrode) of the capacitor 2 is connected to a node N2. The PMOS transistor 3 is between the node N2 and a node N3. The node N3 receives the input voltage V1in.

In the second element group, the NMOS transistor 4 is between a node N4 and the ground voltage GND. The node N4 is connected to a terminal "c" (first electrode) of the capacitor 5. Another terminal "d" (second terminal) of the capacitor 5 is connected to a node N5. The PMOS transistor 6 is arranged between the nodes N3 and N5.

A PMOS transistor 7 is arranged between the nodes N2 and N4. The node N2 is between the capacitor 2 and the PMOS transistor 3. The node N4 is between the terminal c of the capacitor 5 and the NMOS transistor 4. A PMOS transistor 8 is arranged between the nodes N1 and N3. The node N1 is between the terminal a of the capacitor 2 and the NMOS transistor 1.

The node N5 is connected to a node N6 through a PMOS transistor 9. The node N6 is connected to a terminal e of a capacitor 10. The other terminal of the capacitor 10 is connected to the ground voltage GND. The node N6 provides an output voltage V1out.

The step-up circuit has a timing circuit 20 for generating a control signal A1, a control signal /A1 that is an inversion of the control signal A1, and a control signal /B1. The control signal A1 turns ON/OFF the NMOS transistors 1 and 4. The control signal /A1 turns ON/OFF the PMOS transistors 3 and 6. The control signal /B1 turns ON/OFF the PMOS transistors 7, 8, and 9. The capacitors 2 and 5 may be arranged on or outside a semiconductor substrate.

Figure 4:
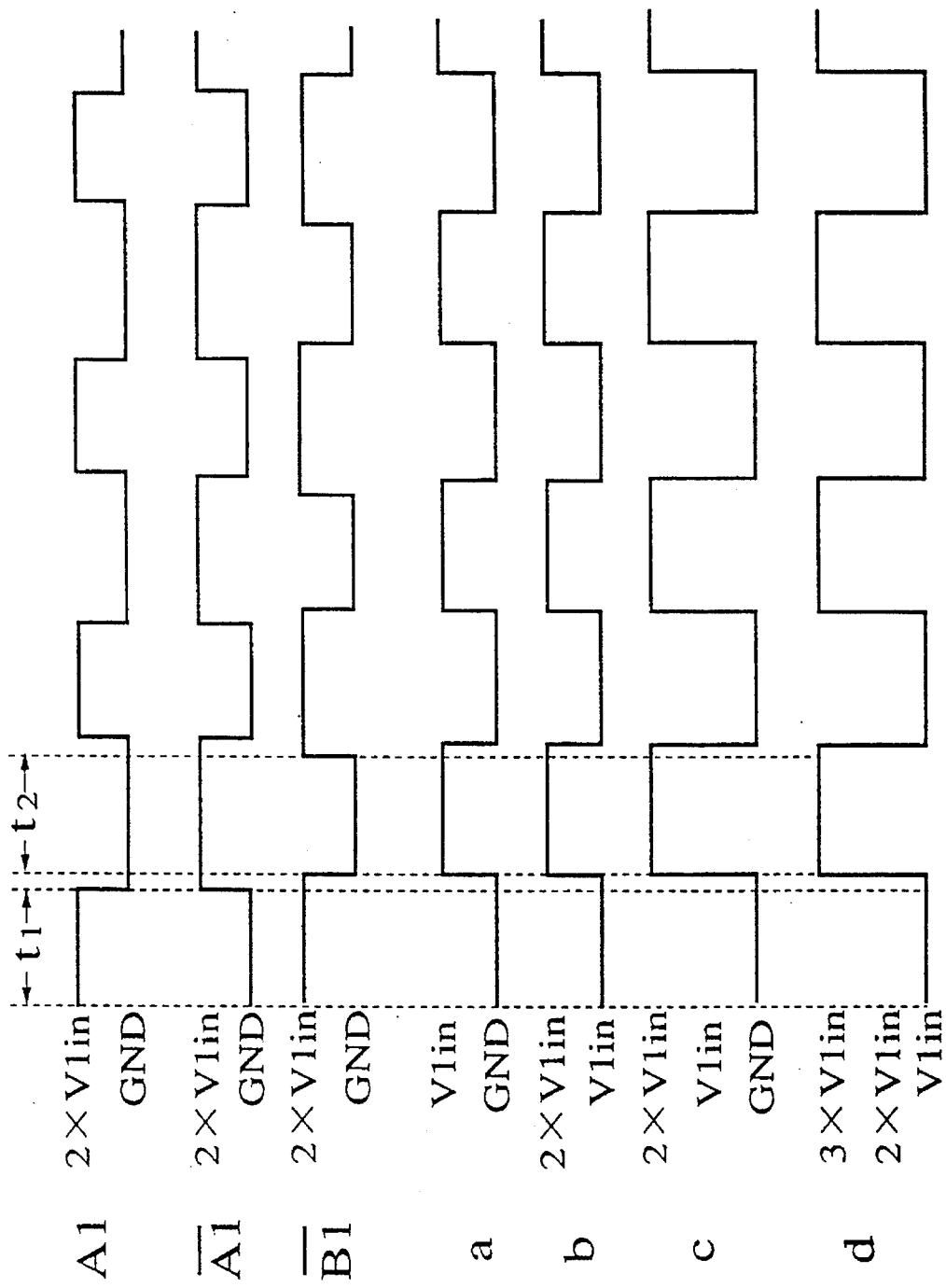
FIG. 4 is a timing chart showing the operation of the step-up circuit of FIG. 3.

FIG. 4 is a timing chart showing the operation of the step-up circuit of FIG. 3.

In a period t1, the control signal A1 is HIGH and the control signal /A1 is LOW to turn ON the NMOS transistors 1 and 4 and PMOS transistors 3 and 6. At this time, the control signal /B1 is HIGH to turn OFF the PMOS transistors 7, 8, and 9. As a result, the ground voltage GND is applied to the terminal a of the capacitor 2 through the NMOS transistor 1, and the input voltage V1in is applied to the other terminal b of the capacitor 2 through the PMOS transistor 3. The ground voltage GND is also applied to the terminal c of the capacitor 5 through the NMOS transistor 4, and the input voltage V1in is also applied to the other terminal d of the capacitor 5 through the PMOS transistor 6.

When the control signals A1 changes to LOW and the control signal /A1 to HIGH to turn OFF the NMOS transistors 1 and 4 and PMOS transistors 3 and 6, the capacitors 2 and 5 hold each a potential difference corresponding to the input voltage V1in.

In a period t2, the control signal /B1 is LOW to turn ON the PMOS transistors 7, 8, and 9. As a result, the input voltage V1in is applied to the terminal a of the capacitor 2 through the PMOS transistor 8. Then, the capacitor 2 causes coupling, and the voltage of the terminal b of the capacitor 2 becomes twice as large as the voltage V1in. The voltage twice as large as the voltage V1in is applied to the terminal c of the capacitor 5 through the PMOS transistor 7. As a result, the capacitor 5 causes coupling, and therefore, the voltage of the terminal d of the capacitor 5 becomes three times as large as the voltage V1in, to charge the capacitor 10 through the PMOS transistor 9.

The control signal /B1 changes to HIGH to turn OFF the PMOS transistors 7, 8, and 9. At this time, the voltage of the terminal e of the capacitor 10 is three times as large as the input voltage V1in. Namely, the output voltage V1out is three times as large as the input voltage V1in. These operations are periodically repeated to maintain the output voltage V1out three times as large as the input voltage V1in.

In this way, the triple step-up circuit of the present invention carries out two step-up operations per cycle. Namely, it carries out the operations of (1) charging the capacitors 2 and 5 and (2) coupling each of the capacitors, to provide the output voltage V1out that is three times as large as the input voltage V1in. These operations (1) and (2) are achieved in the periods t1 and t2 of FIG. 4, respectively. The present invention increases an input voltage by "m" (m being an integer equal to or larger than two) in two operations.

As explained above, the present invention is capable of shortening a step-up time. When the output voltage V1out is supplied to the next circuit, no decrease will occur in the output voltage with respect to a load current. The output voltage provided by the present invention is stable.

The step-up efficiency of the capacitors 2 and 5 in an initial stage will be explained. It is supposed that the MOS transistors have no ON-resistance and that the capacitors have an identical capacitance value.

The capacitors are discharged at first, to provide no potential difference between the opposite terminals of each capacitor. When the step-up operation (1) mentioned above is carried out, the terminal b of the capacitor 2 and the terminal d of the capacitor 5 hold each the input voltage V1in. The operation (2) causes the capacitors 5 and 10 to share charges, and therefore, the output voltage V1out becomes 3/2×V1in=(3×V1in [the voltage of the terminal d of the capacitor 5]+0 [the voltage of the terminal e of the capacitor 10 before sharing charges])/2 [the number of capacitors]. Namely, the output voltage V1out is 50% of the voltage (3×V1in) that must be provided under a steady state. In the case of multiplying an input voltage by "m," the first cycle of the present invention provides 50% of a required output voltage.

The effect of the present invention of minimizing step-up operations per cycle and improving step-up efficiency becomes more apparent as the number of times of stepping up an input voltage increases.

Figure 5:
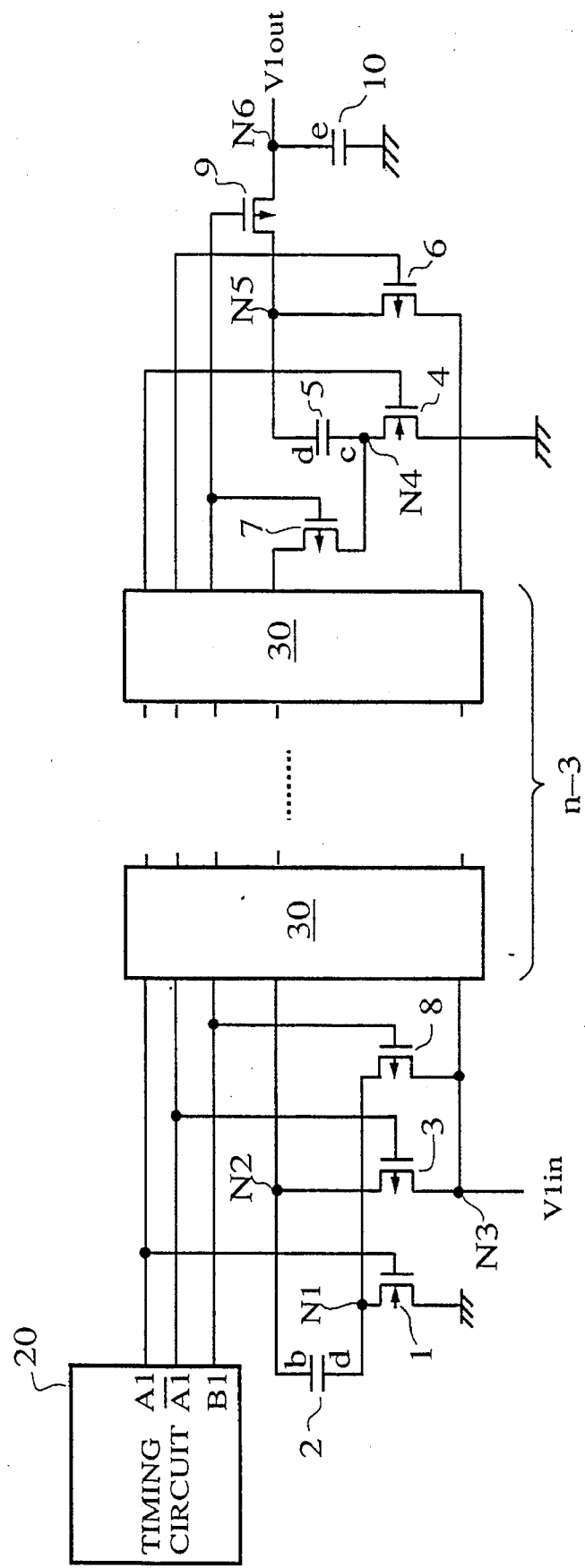
FIG. 5 is a circuit diagram showing a generalized model of the step-up circuit of FIG. 3.
Figure 6:
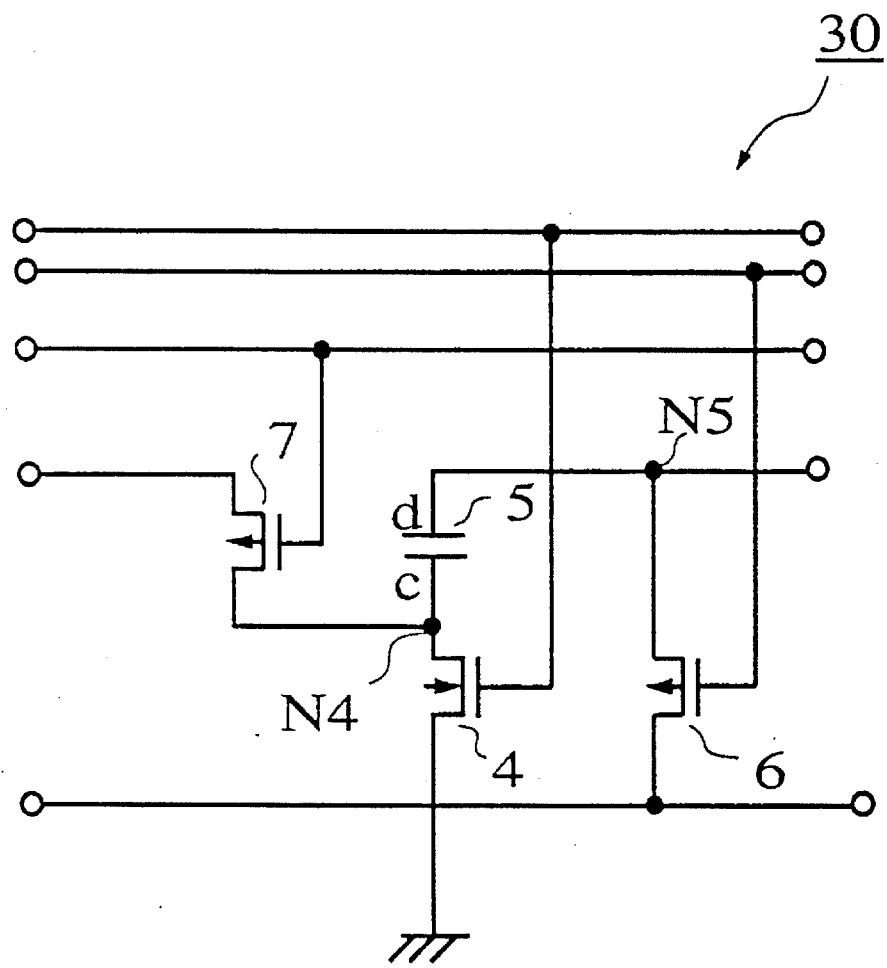
FIG. 6 is a circuit diagram showing a unit element added to the arrangement of FIG. 5 depending on the number of step-up stages required.

FIG. 5 is a circuit diagram showing an n-times step-up circuit according to the present invention. This embodiment is realized by connecting a required number of unit elements 30 (one of which is shown in FIG. 6) in series. The unit element 30 of FIG. 6 is equivalent to a part of the circuit of FIG. 3. In FIGS. 3 and 6, the same reference numerals represent the same parts whose operations have been explained above.

To realize an n-times step-up circuit, "n–3" pieces of the unit element 30 of FIG. 6 are inserted into a part indicated with a dotted line in FIG. 5. For example, the circuit of FIG. 3 is n=3.

Figure 7:
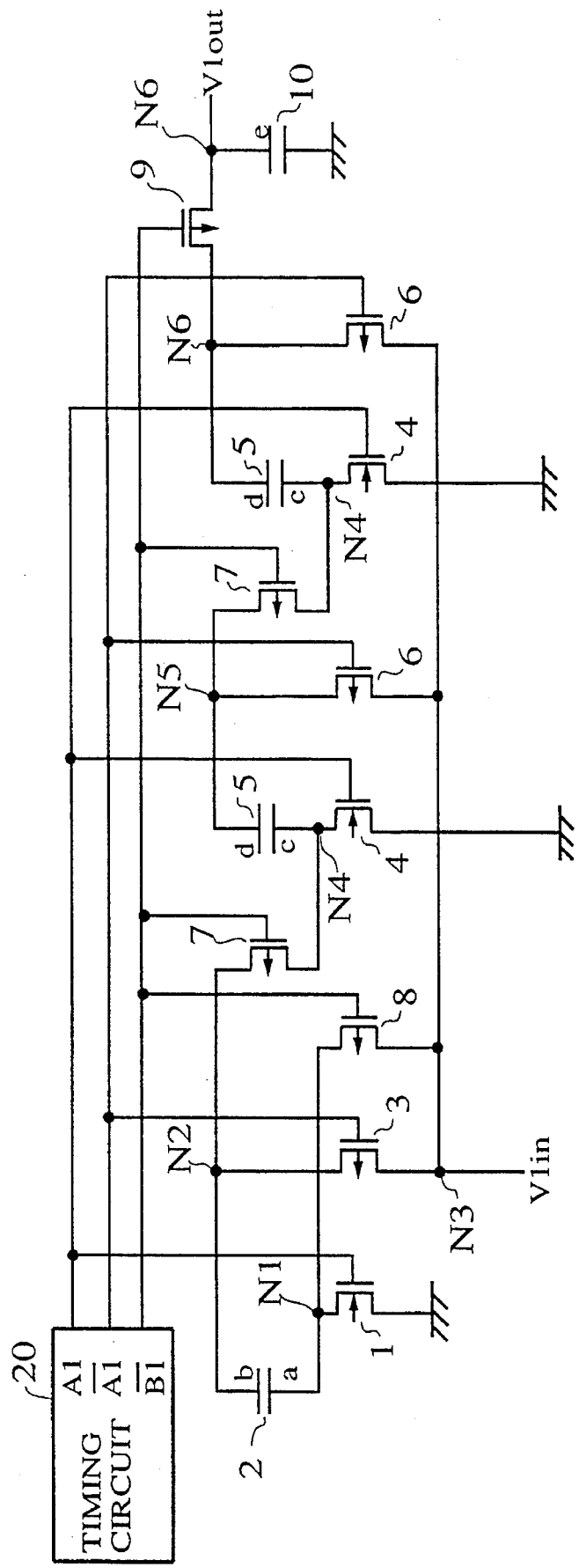
FIG. 7 is a circuit diagram showing a step-up circuit according to another embodiment of the present invention.

FIG. 7 is a circuit diagram showing a step-up circuit according to another embodiment of the present invention. This is a quadruple step-up circuit with n=4 in the example of FIG. 5. The voltage of a node N5 is "3×V1in." This voltage is increased to "4×V1in" at a node N7, which provides an output voltage V1out. Although the output voltage V1out is four times as large as the input voltage V1in, the embodiment involves only two step-up operations in each cycle.

In summary, a step-up circuit according to the present invention involves only two step-up operations in each cycle to provide an output voltage that is n times as large as an input voltage, compared with "2×(n–1)" operations per cycle of the prior art. Unlike the prior art that achieves a step-up efficiency of "1/n×100" percents per cycle, the present invention realizes a step-up efficiency of 50%.

What is claimed is:

1. A step-up circuit comprising:
    a first switching element, a first capacitor element, and a second switching element connected in series between a first power source and a second power source in this order;
    a third switching element for selectively connecting a node between said first switching element and said first capacitor element to the second power source;
    a fourth switching element, a second capacitor element, and a fifth switching element connected in series between the first power source and the second power source in this order;
    a sixth switching element for selectively connecting a node between said first capacitor element and said second switching element to a node between said second capacitor element and said fourth switching element; and
    a timing signal generator for supplying control signals to said first to sixth switching elements.

2. The step-up circuit according to claim 1, further comprising a seventh switching element and a third capacitor element connected in series between a node between said second capacitor element and said fifth switching element and the first power source.

3. The step-up circuit according to claim 1, further comprising:
    a seventh switching element, a third capacitor element, and an eighth switching element connected in series between the first power source and the second power source; and
    a ninth switching element for selectively connecting a node between said second capacitor element and said fifth switching element to a node between the third capacitor element and the seventh switching element.

4. The step-up circuit according to claim 3, further comprising a tenth switching element and a fourth capacitor element connected in series between a node between the third capacitor element and the eighth switching element and the first power source.

5. A method of multiplying a voltage between a low voltage power source and a second power source by a constant, comprising the steps of:
    connecting capacitor elements in parallel between the first power source and the second power source and charging the capacitor elements;
    connecting the capacitor elements in series between the second power source and an output terminal to obtain an output voltage across the capacitor element the output terminal; and repeating these steps to multiply the voltage between the first and second power sources by the constant.

* * * * *